United States Patent
Chen et al.

(10) Patent No.: US 11,368,270 B2
(45) Date of Patent: Jun. 21, 2022

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Wenhong Chen, Dongguan (CN); Zhihua Shi, Dongguan (CN)

(73) Assignee: GUANGDONG OPPO MOBILE TELECOMMUNICATIONS, CORP., LTD., Guangdong (CN)

(*) Notice: Subject to any disclaimer, the term of this patent is extended or adjusted under 35 U.S.C. 154(b) by 10 days.

(21) Appl. No.: 16/757,709

(22) PCT Filed: Oct. 27, 2017

(86) PCT No.: PCT/CN2017/108153
§ 371 (c)(1),
(2) Date: Apr. 20, 2020

(87) PCT Pub. No.: WO2019/080132
PCT Pub. Date: May 2, 2019

(65) Prior Publication Data
US 2020/0389267 A1  Dec. 10, 2020

(51) Int. Cl.
*H04W 52/08* (2009.01)
*H04L 5/00* (2006.01)
(Continued)

(52) U.S. Cl.
CPC ............ *H04L 5/005* (2013.01); *H04W 52/146* (2013.01); *H04W 52/365* (2013.01); *H04W 72/042* (2013.01); *H04W 72/1284* (2013.01)

(58) Field of Classification Search
CPC ............ H04W 52/146; H04W 52/325; H04W 52/242; H04W 80/02; H04W 52/08;
(Continued)

(56) References Cited

U.S. PATENT DOCUMENTS

2014/0247796 A1  9/2014  Ouchi
2015/0016317 A1  1/2015  Park et al.
(Continued)

FOREIGN PATENT DOCUMENTS

CN  102209374 A  10/2011
CN  103312484 A   9/2013
(Continued)

OTHER PUBLICATIONS

LG Electronics: "Discussion on UL power control for NR", 3GPP Draft; R1-1717983 NR UL PC Final, 3rd Generation Partnership Project T3GPP), Mobile Competence Centre; 650, Route Deslucioles; F-06921 Sophia-Antipolis Cedex France vol. RAN WG1, No. Prague, cz; Oct. 9, 2017-Oct. 13, 2017 Oct. 8, 2017 (Oct. 10, 2017), XP051341167, *p. 1, line 13-line 28 ** p. 3, line 13-line 36*.
(Continued)

*Primary Examiner* — Tu X Nguyen
(74) *Attorney, Agent, or Firm* — Ladas & Parry, LLP (57) ABSTRACT

Provided are a data transmission method, a terminal device and a network device. The method comprises: a terminal device acquires a plurality of sounding reference signal resource indications (SRIs) from downlink control information (DCI) for scheduling uplink data, each SRI among the plurality of SRIs corresponding to at least one power control parameter; the terminal device determines a target SRI among the plurality of SRIs; the terminal device determines a power control parameter of the uplink data according to the at least one power control parameter corresponding to the target SRI; and the terminal device determines the transmit
(Continued)

power of the uplink data according to the power control parameter of the uplink data. According to the embodiments of the present invention, the terminal device may determine a target SRI among a plurality of SRIs and accurately determine the transmit power of uplink data according to at least one power control parameter corresponding to the target SR, thereby improving data transmission efficiency.

20 Claims, 2 Drawing Sheets

(51) Int. Cl.
    *H04W 52/14*      (2009.01)
    *H04W 52/36*      (2009.01)
    *H04W 72/04*      (2009.01)
    *H04W 72/12*      (2009.01)

(58) Field of Classification Search
    CPC ..... H04W 52/34; H04W 72/04; H04W 16/28; H04W 52/10; H04W 48/12; H04W 80/08
    See application file for complete search history.

(56) References Cited

U.S. PATENT DOCUMENTS

| | | |
|---|---|---|
| 2018/0014257 A1 | 1/2018 | Ouchi et al. |
| 2019/0075526 A1 | 3/2019 | Nagaraj et al. |
| 2020/0162133 A1* | 5/2020 | Harrison ............... H04B 7/0486 |
| 2020/0305088 A1* | 9/2020 | Nory .................... H04B 7/0626 |

FOREIGN PATENT DOCUMENTS

| | | | |
|---|---|---|---|
| CN | 103843423 A | | 6/2014 |
| KR | 20140138616 A | | 12/2014 |
| WO | 2011139200 A1 | | 11/2011 |
| WO | 2017146755 A1 | | 8/2017 |

OTHER PUBLICATIONS

ITL: "UL power control and PHR", 3GPP Draft; R1-1718625 PC, 3rd Generation Partnership Project (3GPP), Mobilecompetence Centre ; 650, Route Des Lucioles ; F-06921 Sophia-Antipolis Cedex France vol. RAN WG1, No. Prague, CZ; Oct. 9, 2017-Oct. 13, 2017 Oct. 8, 2017 (Oct. 8, 2017), XP051341799, Retrieved from the Internet: URL: http://www.3gpp.org/ftp/Meetings 3GPP SYNC/ RAN1/Docs/[ retrieved on Oct. 8, 2017], *section 2.1*.
Supplementary European Search Report in the European application No. 17929868.2, dated Sep. 17, 2020.
Written Opinion of the International Search Authority in the international application No. PCT/CN2017/108153, dated Jul. 20, 2018.
OPPO, On uplink power control for NR, Discussion and Decision, 3GPP TSG RAN WG1 Meeting #90bis R1-1718031, Oct. 9-13, 2017.
International Search Report in the international application No. PCT/CN2017/108153, dated Jul. 20, 2018.
Written Opinion of the International Searching Authority in international application No. PCT/CN2017/108153, dated Jul. 16, 2018, with English translation provided by Google Translate.
First Office Action of the Korean application No. 10-2020-7013841, dated Apr. 20, 2021.
First Office Action of the European application No. 17929868.2, dated May 18, 2021.
Office Action of the Indian application No. 202017021614, dated Jun. 24, 2021.
Second Office Action of the European application No. 17929868.2, dated Nov. 22, 2021.
Subsequent Examination Report of the Indian application No. 202017021614, dated Dec. 2, 2021.
Notice of Allowance of the Korean application No. 10-2020-7013841, dated Oct. 29, 2021.
Nokia, Nokia Shanghai Bell, Discussion on NR power control framework [online], 3GPP TSG RAN WG1 adhoc_NR_AH_1709 R1-1716127, Internet<URL: http://www.3gpp.org/ftp/tsg_ran/WG1_ RL1/TSGR1_AH/NR_AH_1709/Docs/R1-1716127.zip>, Sep. 21, 2017, entire document.
ZTE, Sanechips, On NR Power Control [online], 3GPP TSG RAN WG1 #90b R1-1717438, Internet<URL: http://www.3gpp.org/ftp/ tsg_ran/WG1_RL1/TSGR1_90b/Docs/R1-1717438.zip>, Oct. 13, 2017, entire document.
First Office Action of the Japanese application No. 2020-522369, dated Sep. 17, 2021.

* cited by examiner

DATA TRANSMISSION METHOD, TERMINAL DEVICE AND NETWORK DEVICE

CROSS-REFERENCE TO RELATED APPLICATION

This application is the U.S. national phase of PCT/CN2017/108153, filed on Oct. 27, 2017, the disclosure of which is incorporated by reference herein in its entirety.

TECHNICAL FIELD

Embodiments of the disclosure relate to the field of communication, and more particularly, to a data transmission method, a terminal device and a network device.

BACKGROUND

A beam-based power control method is introduced into New Radio (NR).

Specifically, independent power control parameters can be adopted for signals sent by a terminal device through different beams, thereby obtaining different transmit power.

However, for transmission of uplink data, a power control parameter adopted by a terminal device may be related to a beam for data transmission. Specifically, a beam for data transmission is usually indicated through a Sounding Reference Signal (SRS) Resource Indication (SRI) in Downlink Control Information (DCI) scheduling data.

Therefore, if a terminal device simultaneously sends uplink data via multiple beams, how to determine transmit power of the uplink data is a problem urgent to be solved in this field.

SUMMARY

A data transmission method, a terminal device and a network device are provided, which can accurately determine transmit power of uplink data and further improve data transmission efficiency.

A first aspect provides a data transmission method, which may include the following operations.

A terminal device acquires multiple SRIs from DCI scheduling uplink data, each of the multiple SRIs corresponding to at least one power control parameter.

The terminal device determines a target SRI of the multiple SRIs.

The terminal device determines a power control parameter for the uplink data according to the at least one power control parameter corresponding to the target SRI.

The terminal device determines transmit power of the uplink data according to the power control parameter for the uplink data.

In the embodiments of the disclosure, the terminal device may indicate a beam for transmission of uplink data through the multiple SRIs in the DCI scheduling the uplink data, and moreover, each of the multiple SRIs corresponds to at least one power control parameter. Therefore, the terminal device may determine the target SRI of the multiple SRIs and accurately determine the transmit power of the uplink data according to the at least one power control parameter corresponding to the target SRI to further improve data transmission efficiency.

In some possible implementations, the operation that the multiple SRIs are acquired may include the following operation.

The terminal device receives a bitmap sequence sent by a network device, the bitmap sequence including multiple bits and the multiple bits being used to indicate the multiple SRIs.

In some possible implementations, the operation that the terminal device determines the target SRI of the multiple SRIs may include the following operation.

The terminal device determines the first indicated SRI of the multiple SRIs as the target SRI.

In some possible implementations, the operation that the terminal device determines the target SRI of the multiple SRIs may include the following operation.

The terminal device determines an SRI, corresponding to an SRS resource for transmitting an SRS via a same beam or antenna set as a beam or antenna set for transmission of the uplink data, of the multiple SRIs as the target SRI.

In some possible implementations, the operation that the terminal device determines the target SRI of the multiple SRIs may include the following operation.

The terminal device determines the SRI, corresponding to an SRS resource having a quasi-co-location relationship with the uplink data, of the multiple SRIs as the target SRI.

In some possible implementations, the uplink data may include part of data in uplink data carried in a Physical Uplink Shared Channel (PUSCH) scheduled by the DCI.

In some possible implementations, the uplink data carried in the PUSCH may include data of N transmission layers, and the uplink data may include data of M transmission layers in the N transmission layers, N>M>0.

In some possible implementations, the target SRI may correspond to the data of the M transmission layers.

In some possible implementations, the at least one power control parameter corresponding to a first SRI of the multiple SRIs may be a power control parameter for transmitting SRS on an SRS resource indicated by the first SRI.

In some possible implementations, before the operation that the terminal device determines the target SRI of the multiple SRIs, the method may further include the following operation.

The terminal device receives correspondence information sent by the network device, the correspondence information including a correspondence between each of the multiple SRIs and at least one power control parameter.

In some possible implementations, the operation that the terminal device determines the power control parameter for the uplink data according to the at least one power control parameter corresponding to the target SRI may include the following operation.

The terminal device determines the at least one power control parameter corresponding to the target SRI as the power control parameter for the uplink data.

In some possible implementations, the target SRI may be multiple second SRIs of the multiple SRIs, and the operation that the terminal device determines the power control parameter for the uplink data according to the at least one power control parameter corresponding to the target SRI may include the following operation.

The terminal device determines the power control parameter for the uplink data based on processing of multiple power control parameters corresponding to the multiple second SRIs.

In some possible implementations, the at least one power control parameter may include a path loss value used by the terminal device to determine the uplink transmit power, or, the at least one power control parameter may include information of a downlink signal, the information of the downlink signal being used by the terminal device to measure the path loss value for determining the uplink transmit power.

In some possible implementations, the at least one power control parameter may include the path loss value used by the terminal device to determine the uplink transmit power, and the operation that the terminal device determines the power control parameter for the uplink data may include the following operation based on processing of the multiple power control parameters corresponding to the multiple second SRIs.

The terminal device performs weighted averaging on the path loss values corresponding to the multiple second SRIs respectively to obtain a target path loss value, and the terminal device determines the target path loss value as the path loss value for determining the uplink transmit power of the uplink data.

In some possible implementations, the downlink signal may include a downlink Synchronous Signal Block (SSB) or a Channel State Information Reference Signal (CSI-RS).

In some possible implementations, the at least one power control parameter may include at least one of an open-loop power control parameter or a closed-loop power control parameter.

In some possible implementations, the method may further include the following operation.

The terminal device sends the uplink data according to the transmit power of the uplink data; or, the terminal device determines a Power Headroom Report (PHR) according to the transmit power of the uplink data; or, the terminal device determines transmit power of another uplink signal except the uplink data according to the transmit power of the uplink data.

A second aspect provides a data transmission method, which includes the following operations.

A network device determines multiple SRIs, each of the multiple SRIs corresponding to at least one power control parameter.

The network device sends the multiple SRIs to a terminal device.

In some possible implementations, the operation that the network device sends the multiple SRIs to the terminal device includes the following operation.

The network device sends a bitmap sequence to the terminal device, the bitmap sequence including multiple bits and the multiple bits being used to indicate the multiple SRIs.

In some possible implementations, before the operation that the network device sends the multiple SRIs to the terminal device, the method further includes the following operation.

The network device sends correspondence information to the terminal device, the correspondence information including a correspondence between each of the multiple SRIs and at least one power control parameter.

In some possible implementations, the method is characterized in that the at least one power control parameter includes a path loss value used by the terminal device to determine uplink transmit power, or, the at least one power control parameter includes information of a downlink signal, the information of the downlink signal being used by the terminal device to measure the path loss value for determining the uplink transmit power.

In some possible implementations, the downlink signal includes a downlink SSB or a CSI-RS.

In some possible implementations, the method is characterized in that the at least one power control parameter includes at least one of an open-loop power control parameter or a closed-loop power control parameter.

In some possible implementations, the method further includes the following operation.

The network device receives uplink data sent by the terminal device.

A third aspect provides a terminal device, which may include an acquisition unit and a processing unit.

The acquisition unit may be configured to acquire multiple SRIs from DCI scheduling uplink data, each of the multiple SRIs corresponding to at least one power control parameter.

The processing unit may be configured to determine a target SRI of the multiple SRIs, determine a power control parameter for the uplink data according to the at least one power control parameter corresponding to the target SRI and determine transmit power of the uplink data according to the power control parameter for the uplink data.

A fourth aspect provides a terminal device, which includes an acquirer and a processor.

The acquirer is configured to acquire multiple SRIs from DCI scheduling uplink data, each of the multiple SRIs corresponding to at least one power control parameter.

The processor is configured to determine a target SRI of the multiple SRIs, determine a power control parameter for the uplink data according to the at least one power control parameter corresponding to the target SRI and determine transmit power of the uplink data according to the power control parameter for the uplink data. A fifth aspect provides a network device, which includes a processing unit and a transceiver unit.

A fifth aspect provides a network device, which includes a processing unit and a transceiver unit.

The processing unit is configured to determine multiple SRIs, each of the multiple SRIs corresponding to at least one power control parameter.

The transceiver unit is configured to send the multiple SRIs to a terminal device.

A sixth aspect provides a network device, which includes a processor and a transceiver.

The processor is configured to determine multiple SRIs, each of the multiple SRIs corresponding to at least one power control parameter.

The transceiver is configured to send the multiple SRIs to a terminal device.

A seventh aspect provides a computer-readable medium, which is configured to store a computer program, the computer program including an instruction configured to execute the method embodiment of the first aspect or the second aspect.

An eighth aspect provides a computer chip, which includes an input interface, an output interface, at least one processor and a memory. The processor is configured to execute a code in the memory. When the code is executed, the processor may implement each process executed by the terminal device in the data transmission method in the first aspect and each implementation.

A ninth aspect provides a computer chip, which includes an input interface, an output interface, at least one processor and a memory. The processor is configured to execute a code in the memory. When the code is executed, the processor may implement each process executed by the network device in the data transmission method in the second aspect and each implementation.

A tenth aspect provides a communication system, which includes the abovementioned network device and the abovementioned terminal device.

DETAILED DESCRIPTION

Figure 1:
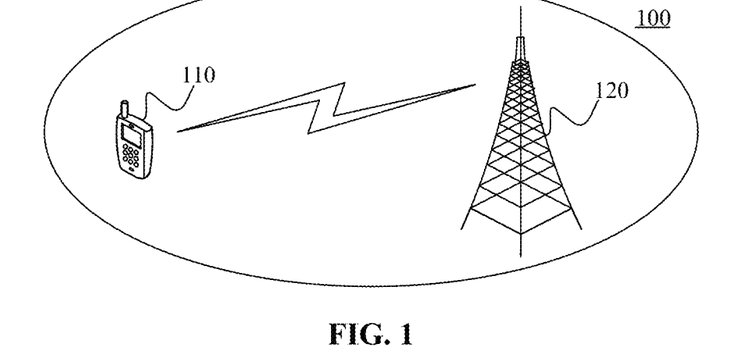
FIG. 1 is an example of an application scenario according to the disclosure.

FIG. 1 is a schematic diagram of an application scenario according to an embodiment of the disclosure.

As illustrated in FIG. 1, a communication system 100 may include a terminal device 110 and a network device 120. The network device 120 may communicate with the terminal device 110 through an air interface. Multi-service transmission is supported between the terminal device 110 and the network device 120.

It is to be understood that the embodiments of the disclosure are described only with the communication system 100 as an example but the embodiments of the disclosure are not limited thereto. That is, the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, LTE Time Division Duplex (TDD), and a Universal Mobile Telecommunication System (UMTS).

In addition, various embodiments of the disclosure are described in conjunction with the network device and the terminal device.

The network device 120 may refer to any entity configured to send or receive a signal on a network side, and for example, may be Machine Type Communication (MTC) User Equipment (UE), a Base Transceiver Station (BTS) in the GSM or CDMA, a NodeB in WCDMA, an Evolution Node B (eNB or eNodeB) in LTE and a base station device in a 5th-Generation (5G) network.

The terminal device 110 may be any terminal device. Specifically, the terminal device 110 may communicate with one or more Core Networks (CNs) through a Radio Access Network (RAN), may also be called an access terminal, UE, a user unit, a user station, a mobile station, a mobile radio station, a remote station, a remote terminal, a mobile device, a user terminal, a terminal, a wireless communication device, a user agent or a user device, and for example, may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device and a terminal device in the 5G network.

Figure 2:
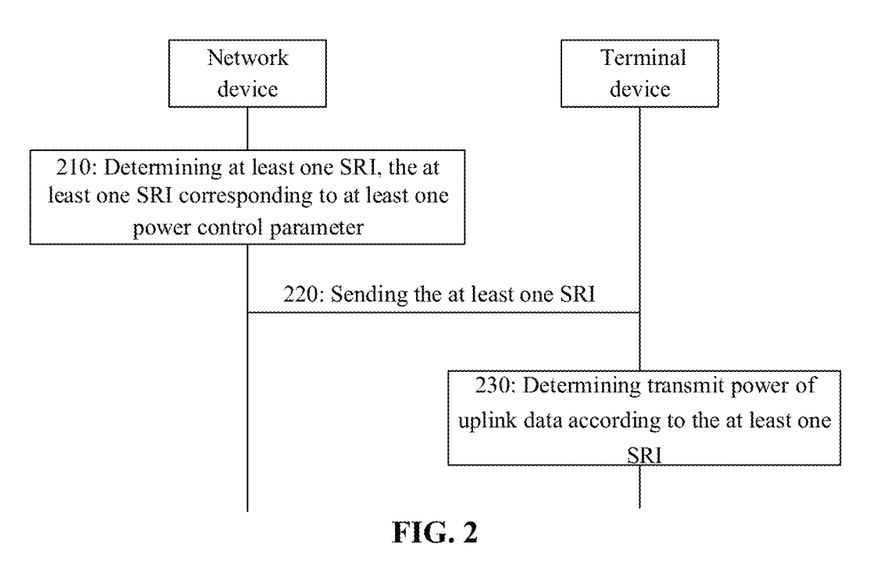
FIG. 2 is a schematic flowchart of a data transmission method according to an embodiment of the disclosure.

FIG. 2 is a schematic flowchart of a data transmission method according to an embodiment of the disclosure.

As illustrated in FIG. 2, the method includes the following operations.

At 210, a network device determines at least one SRI, the at least one SRI corresponding to at least one power control parameter.

At 220, the network device sends the at least one SRI to a terminal device.

At 230, the terminal device determines transmit power of uplink data according to the at least one SRI.

Specifically, the terminal device acquires multiple SRIs from DCI scheduling the uplink data, each of the multiple SRIs corresponding to at least one power control parameter. In such a manner, the terminal device may determine a target SRI of the multiple SRIs and determine a power control parameter for the uplink data according to the at least one power control parameter corresponding to the target SRI. Furthermore, the terminal device may determine the transmit power of the uplink data according to the power control parameter for the uplink data.

For example, the terminal device acquires a bitmap sequence from the DCI scheduling the uplink data. The bitmap sequence may include multiple bits, and the multiple bits are configured to indicate the multiple SRIs. Moreover, each of the multiple SRIs corresponds to at least one power control parameter.

For example, the terminal may directly configure N independent SRIs, each SRI including k bits and corresponding to an SRS resource.

It is to be noted that, in the embodiment of the disclosure, the terminal device may indicate a beam for transmission of uplink data through the multiple SRIs in the DCI scheduling the uplink data, and moreover, each of the multiple SRIs corresponds to at least one power control parameter.

That is, the terminal device may determine the at least one power control parameter corresponding to an SRI in the at least one power control parameter corresponding to each of the multiple SRIs and determine the power control parameter for the uplink data according to the at least one power control parameter corresponding to the SRI. For convenient description, the SRI is called the target SRI in the embodiment of the disclosure.

An implementation of correspondence of each of the multiple SRIs to at least one power control parameter in the embodiment of the disclosure will be described below.

In an embodiment, a power control parameter for transmitting SRS on an SRS resource indicated by each of the multiple SRIs may be pre-configured by the network device.

In other words, the at least one power control parameter corresponding to a first SRI of the multiple SRIs is a power control parameter for SRS transmission on the SRS resource indicated by the first SRI. The first SRI is any SRI in the multiple SRIs.

That is, in the embodiment of the disclosure, the at least one power control parameter corresponding to the target SRI is a power control parameter for SRS transmission on the SRS resource indicated by the target SRI.

In another embodiment, there exists a piece of correspondence information for the multiple SRIs and the at least one power control parameter corresponding to each of the multiple SRIs. The terminal device may determine the power control parameter for the uplink data according to a correspondence and the determined target SRI and further determine the transmit power of the uplink data.

Furthermore, the terminal device, before acquiring the multiple SRIs from the DCI scheduling the uplink data, may receive the correspondence information sent by the network device, further determine at least one power control parameter for the uplink data according to the correspondence information and the determined target SRI and further determine the transmit power of the uplink data.

For conveniently understanding the technical solution of the embodiment of the disclosure, the at least one power control parameter in the embodiment of the disclosure will be exemplarily described below.

Specifically, the at least one power control parameter in the embodiment of the disclosure may include any parameter configured to determine the uplink transmit power.

For example, the at least one power control parameter may include a path loss value used by the terminal device to determine the uplink transmit power, or, the at least one power control parameter includes information of a downlink signal, the information of the downlink signal being used by the terminal device to measure the path loss value for determining the uplink transmit power. Optionally, the downlink signal includes a downlink SSB or a CSI-RS.

For another example, the at least one power control parameter may also include at least one of an open-loop power control parameter or a closed-loop power control parameter.

For example, the terminal device may determine the uplink transmit power according to the following formula:

$$P_{PUSCH,c}(i) = \min\left\{\begin{array}{l} P_{CMAX,c}(i), \\ 10\log_{10}(M_{PUSCH,c}(i)) + P_{0,c}(j) + \alpha_c(j) \cdot PL_c(k) + \Delta_{TF,c}(i) + f_c(i,l) \end{array}\right\},$$

where $P_{PUSCH,c}(i)$ represents the uplink transmit power, $P_{0,c}(j)$ represents target power, $\alpha_c(j)$ represents a path loss factor, $PL_c(k)$ represents an estimated path loss value, and $f_c(i,l)$ represents a closed-loop power regulation function.

It may be seen according to the formula that different $P_{0,c}(j)$, $\alpha_c(j)$, $PL_c(k)$ and $f_c(i,l)$ correspond to different uplink transmit power. In addition, j, k and i are independent variables of the functions $P_{0,c}(j)$, $\alpha_c(j)$, $PL_c(k)$ and $f_c(i,l)$, so different j, k and i correspond to different uplink transmit power.

That is, the at least one power control parameter in the embodiment of the disclosure may correspond to $P_{0,c}(j)$, $\alpha_c(j)$, $PL_c(k)$ and $f_c(i,l)$ in the formula, and may also correspond to j, k and i in the formula. There are no specific limits made in the embodiment of the disclosure.

For example, the information of the downlink signal in the embodiment of the disclosure may be an index of a target downlink reference signal configured to measure the path loss value in multiple downlink reference signals pre-configured by the network device, for example, k in the formula.

For another example, the open-loop power control parameter in the embodiment of the disclosure may be indication information of the target power $P_{0,c}(j)$, may also be indication information of the path loss factor $\alpha_c(j)$ and may also be indication information of the closed-loop power regulation function $f_c(i,l)$.

For another example, the open-loop power control parameter in the embodiment of the disclosure may be an index (for example, j in the formula) of a value in multiple pieces of target power $P_{0,c}(j)$ pre-configured by the network device, may also be an index (for example, j in the formula) of a value in multiple path loss factors $\alpha_c(j)$ pre-configured by the network device and may also be a closed-loop power control process index (for example, j in the formula in a background art).

However, it is to be understood that the at least one power control parameter is described only with the formula as an example and the embodiment of the disclosure is not limited thereto.

It is also to be understood that, in the embodiment of the disclosure, the target SRI may include only one SRI and may also include multiple SRIs.

For example, the target SRI may include only one SRI.

Specifically, the terminal device may determine the at least one power control parameter corresponding to the target SRI as the power control parameter for the uplink data.

For another example, the target SRI is multiple second SRIs of the multiple SRIs.

Specifically, the terminal device determines the power control parameter for the uplink data based on processing of multiple power control parameters corresponding to the multiple second SRIs.

More specifically, if the at least one power control parameter includes the path loss value used by the terminal device to determine the uplink transmit power, the terminal device may perform weighted averaging on the path loss values corresponding to the multiple second SRIs respectively to obtain a target path loss value and further determine the target path loss value as the path loss value for determining the uplink transmit power of the uplink data.

It is to be understood that the operation that the terminal device determines the power control parameter for the uplink data according to the target SRI is only exemplarily described and the embodiment of the disclosure is not limited thereto. For example, the terminal device may process parameters, except the path loss values, corresponding to the multiple second SRIs respectively to determine the power control parameter for the uplink data.

An implementation for the operation that the terminal device determines the target SRI of the multiple SRIs will be exemplarily described below.

In an embodiment, the terminal device determines the first indicated SRI of the multiple SRIs as the target SRI.

Specifically, there is made such a hypothesis that an SRI indication domain in the DCI indicates N SRIs, and the SRI of which corresponding indication information is at the first position in the DCI is determined as the target SRI. For example, if the multiple SRIs are indicated through a bit-map, namely each bit in a bitmap sequence indicates an SRS resource and thus corresponds to an SRI, the target SRI is an SRI corresponding to the first bit indicated to be 1 in the bitmap.

In another embodiment, the terminal device may determine an SRI, corresponding to an SRS resource for transmitting an SRS via a same beam or antenna set as a beam or antenna set for transmission of the uplink data, of the multiple SRIs as the target SRI.

Specifically, the terminal device may determine a target SRS resource in the SRS resources corresponding to the multiple SRIs, transmit the uplink data by use of a beam or antenna set for SRS transmission on the target SRS resource and adopt the SRI corresponding to the target SRS resource as the target SRI to determine the transmit power of the uplink data.

In other words, in the embodiment of the disclosure, the SRS and the uplink data are transmitted by use of the same beam or antenna set.

It is to be understood that the antenna set in the embodiment of the disclosure may include part or all of antennae in sending antennae of the terminal device. For example, the sending antennae of the terminal device are divided into a few independent antenna sets for transmission of uplink data respectively. That is, the antenna set may be an antenna panel.

In another embodiment, the terminal device may determine the SRI, corresponding to an SRS resource having a quasi-co-location relationship with the uplink data, of the multiple SRIs as the target SRI. Specifically, the SRS resource may be quasi-co-location with the uplink data for a space receiving parameter.

In another embodiment, the uplink data includes part of data in uplink data carried in a PUSCH scheduled by the DCI.

For example, the uplink data carried in the PUSCH includes data of N transmission layers, and the uplink data includes data of M transmission layers in the N transmission layers, N>M>0. For example, the most typical scenario is M=1, namely the uplink data includes data of only one transport layer.

In the embodiment of the disclosure, the target SRI may correspond to the data of the M transmission layers. Specifically, when M≥2, the data of the M transmission layers corresponds to the same SRI. However, the embodiment of the disclosure is not limited thereto.

For example, the data of the M transmission layers may also correspond to multiple SRIs.

In other words, if the uplink data is part of data carried in the PUSCH scheduled by the DCI, for example, a data transport layer in multiple data transmission layers carried in the PUSCH, the terminal device may determine respective transmit power for each data transport layer.

In addition, the transmit power of the uplink data in the embodiment of the disclosure may be configured to send the uplink data and may also not be configured to send the uplink data. For example, the terminal device practically has no uplink data.

For example, the terminal device determines and calculates a PHR of the present PUSCH according to the transmit power of the uplink data and reports it to the network device.

For another example, the terminal device determines transmit power of another uplink signal except the uplink data according to the transmit power of the uplink data. For example, the uplink signal may be an SRS. Specifically, the terminal device may add a certain offset value according to the calculated transmit power of the uplink data to obtain transmit power of the SRS.

It is to be understood that the main idea of the embodiment of the disclosure is to implement correspondence of each of the multiple SRIs acquired by the terminal device from the DCI scheduling the uplink data to at least one power control parameter to enable the terminal device to determine the target SRI of the multiple SRIs and further determine the transmit power of the uplink data according to the at least one power control parameter corresponding to the target SRI.

That is, the abovementioned specific embodiments are only exemplary embodiments of the application and the embodiment of the disclosure is not limited thereto.

Figure 3:
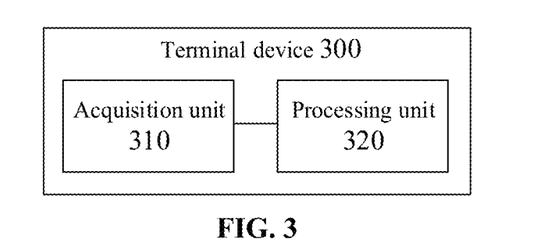
FIG. 3 is a schematic block diagram of a terminal device according to an embodiment of the disclosure.

FIG. 3 is a schematic block diagram of a terminal device according to an embodiment of the disclosure.

As illustrated in FIG. 3, the terminal device 300 includes an acquisition unit 310 and a processing unit 320.

The acquisition unit 310 is configured to acquire multiple SRIs from DCI scheduling uplink data, each of the multiple SRIs corresponding to at least one power control parameter. The processing unit 320 is configured to determine a target SRI of the multiple SRIs, determine a power control parameter for the uplink data according to the at least one power control parameter corresponding to the target SRI and determine transmit power of the uplink data according to the power control parameter for the uplink data.

Optionally, the acquisition unit 310 is specifically configured to:

receive a bitmap sequence sent by a network device, the bitmap sequence including multiple bits and the multiple bits being used to indicate the multiple SRIs.

Optionally, the processing unit 320 is specifically configured to:

determine the first indicated SRI of the multiple SRIs as the target SRI.

Optionally, the processing unit 320 is specifically configured to:

determine an SRI, corresponding to an SRS resource for transmitting an SRS via a same beam or antenna set as a beam or antenna set for transmission of the uplink data, of the multiple SRIs as the target SRI.

Optionally, the processing unit 320 is specifically configured to:

determine the SRI, corresponding to an SRS resource having a quasi-co-location relationship with the uplink data, of the multiple SRIs as the target SRI.

Optionally, the uplink data includes part of data in uplink data carried in a PUSCH scheduled by the DCI.

Optionally, the uplink data carried in the PUSCH includes data of N transmission layers, and the uplink data includes data of M transmission layers in the N transmission layers, N>M>0.

Optionally, the target SRI corresponds to the data of the M transmission layers.

Optionally, the at least one power control parameter corresponding to a first SRI of the multiple SRIs is a power control parameter for transmitting SRS on an SRS resource indicated by the first SRI.

Optionally, the acquisition unit 310 is further configured to:

before the target SRI of the multiple SRIs is determined, receive correspondence information sent by the network device, the correspondence information including a correspondence between each of the multiple SRIs and at least one power control parameter.

Optionally, the at least one power control parameter includes a path loss value used by the terminal device to determine the uplink transmit power, or, the at least one power control parameter includes information of a downlink signal, the information of the downlink signal being used by the terminal device to measure the path loss value for determining the uplink transmit power.

Optionally, the downlink signal includes a downlink SSB or a CSI-RS.

Optionally, the at least one power control parameter includes at least one of an open-loop power control parameter or a closed-loop power control parameter.

Optionally, the acquisition unit 310 is further configured to:

send the uplink data according to the transmit power of the uplink data.

Optionally, the processing unit 320 is further configured to determine a PHR according to the transmit power of the uplink data, or, determine transmit power of another uplink signal except the uplink data according to the transmit power of the uplink data.

Figure 4:
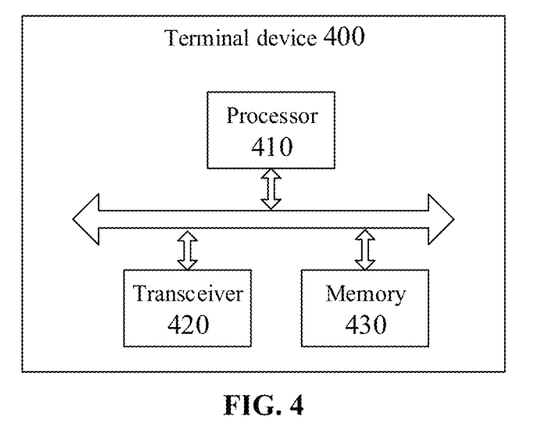
FIG. 4 is a schematic block diagram of another terminal device according to an embodiment of the disclosure.

It is to be noted that the acquisition unit 310 may be implemented by a transceiver and the processing unit 320 may be implemented by a processor. As illustrated in FIG. 4, a terminal device 400 may include a processor 410, a transceiver 420 and a memory 430. The memory 430 may be configured to store indication information and may further be configured to store a code, instruction and the like executed by the processor 410. Each component in the terminal device 400 is connected through a bus system. The bus system includes a data bus, and further includes a power bus, a control bus and a state signal bus.

The terminal device 400 illustrated in FIG. 4 may implement each process implemented by the terminal device in the method embodiment of FIG. 2. For avoiding repetitions, elaborations are omitted herein.

Figure 5:
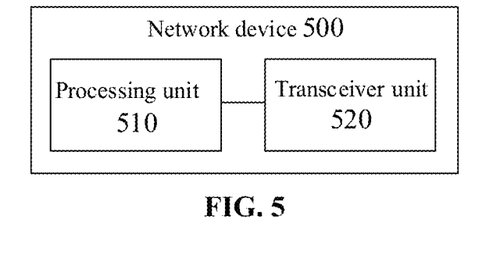
FIG. 5 is a schematic block diagram of a network device according to an embodiment of the disclosure.

FIG. 5 is a schematic block diagram of a network device according to an embodiment of the disclosure.

As illustrated in FIG. 5, the network device 500 includes a processing unit 510 and a transceiver unit 520.

The processing unit 510 is configured to determine multiple SRIs, each of the multiple SRIs corresponding to at least one power control parameter. The transceiver unit 520 is configured to send the multiple SRIs to a terminal device.

Optionally, the transceiver unit 520 is specifically configured to:

send a bitmap sequence to the terminal device, the bitmap sequence including multiple bits and the multiple bits being used to indicate the multiple SRIs.

Optionally, the transceiver unit 520 is further configured to:

before the multiple SRIs are sent to the terminal device, send correspondence information to the terminal device, the correspondence information including a correspondence between each of the multiple SRIs and at least one power control parameter.

Optionally, the processing unit 510 is specifically configured to:

determine the at least one power control parameter corresponding to a target SRI as a power control parameter for uplink data.

Optionally, the target SRI is multiple second SRIs of the multiple SRIs, and the processing unit 510 is further configured to:

determine the power control parameter for the uplink data based on processing of multiple power control parameters corresponding to the multiple second SRIs.

Optionally, the at least one power control parameter includes a path loss value used by the terminal device to determine uplink transmit power, or, the at least one power control parameter includes information of a downlink signal, the information of the downlink signal being used by the terminal device to measure the path loss value for determining the uplink transmit power.

Optionally, the at least one power control parameter includes the path loss value used by the terminal device to determine the uplink transmit power, and the processing unit 510 is specifically configured to:

perform weighted averaging on the path loss values corresponding to the multiple second SRIs respectively to obtain a target path loss value and determine the target path loss value as the path loss value for determining the uplink transmit power of the uplink data.

Optionally, the downlink signal includes a downlink SSB or a CSI-RS.

Optionally, the at least one power control parameter includes at least one of an open-loop power control parameter or a closed-loop power control parameter.

Optionally, the transceiver unit 520 is further configured to:

receive the uplink data sent by the terminal device.

Figure 6:
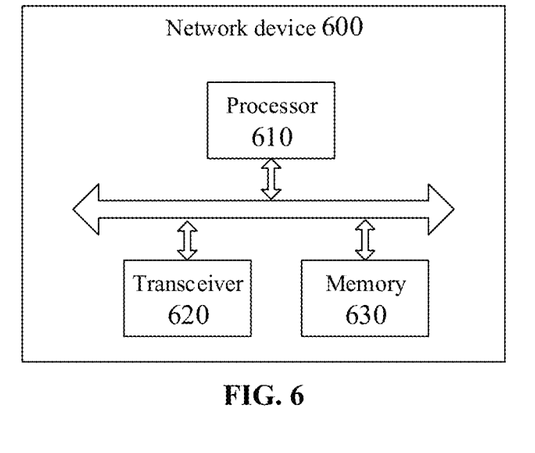
FIG. 6 is a schematic block diagram of another network device according to an embodiment of the disclosure.

It is to be noted that the processing unit 510 may be implemented by a processor and the transceiver unit 520 may be implemented by a transceiver. As illustrated in FIG. 6, a network device 600 may include a processor 610, a transceiver 620 and a memory 630. The memory 630 may be configured to store indication information and may further be configured to store a code, instruction and the like executed by the processor 610. Each component in the network device 600 is connected through a bus system. The bus system includes a data bus, and further includes a power bus, a control bus and a state signal bus.

The network device 600 illustrated in FIG. 6 may implement each process implemented by the network device in the method embodiment of FIG. 2. For avoiding repetitions, elaborations are omitted herein. That is, the method embodiment in the embodiments of the disclosure may be applied to a processor or implemented by the processor.

In an implementation process, each step of the method embodiment in the embodiments of the disclosure may be completed by an integrated logical circuit of hardware in the processor or an instruction in a software form. More specifically, the steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

The processor may be an integrated circuit chip with a signal processing capability and may implement or execute each method, step and logical block diagram disclosed in the embodiments of the disclosure. For example, the processor may be a universal processor, a Digital Signal Processor (DSP), an Application Specific Integrated Circuit (ASIC), a Field Programmable Gate Array (FPGA) or another programmable logical device, transistor logical device and discrete hardware component. In addition, the universal processor may be a microprocessor or the processor may also be any conventional processor and the like.

Moreover, the memory mentioned in the embodiments of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is to be understood that the memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). That is, the memory of a system and method described in the disclosure is intended to include, but not limited to, memories of these and any other proper types.

It is finally to be noted that terms used in the embodiments and appended claims of the disclosure are only for the purpose of describing the specific embodiments and not intended to limit the embodiments of the disclosure.

For example, singular forms "a/an", "said" and "the" used in the embodiments and appended claims of the disclosure are also intended to include plural forms unless other meanings are clearly expressed in the context.

For another example, based on the context, term "while" used here may be explained as "if" or "in case of" or "when" or "responsive to determining" or "responsive to detecting". Similarly, based on the context, phrase "if determining" or "if detecting (stated condition or event)" may be explained as "when determining" or "responsive to determining" or "when detecting (stated condition or event)" or "responsive to detecting (stated condition or event)".

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the embodiments of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the embodiments of the disclosure according to a practical requirement.

In addition, each function unit in the embodiments of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the embodiments of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in the embodiments of the disclosure. The abovementioned storage medium includes: various media capable of storing program codes such as a U disk, a mobile hard disk, a ROM, a RAM, a magnetic disk or an optical disk.

The above is only the specific implementation of the embodiments of the disclosure and not intended to limit the scope of protection of the embodiments of the disclosure. Any variations or replacements apparent to those skilled in the art within the technical scope disclosed by the embodiments of the disclosure shall fall within the scope of protection of the embodiments of the disclosure. Therefore, the scope of protection of the embodiments of the disclosure shall be subject to the scope of protection of the claims.

What is claimed is:

1. A method for data transmission, comprising:
    acquiring, by a terminal device, multiple Sounding Reference Signal (SRS) Resource Indications (SRIs) from Downlink Control Information (DC) scheduling uplink data, each of the multiple SRIs corresponding to at least one power control parameter;
    determining, by the terminal device, a first beam for transmission of the uplink data;
    determining, by the terminal device, a first SRS resource for transmitting an SRS via a same beam as the first beam;
    determining, by the terminal device, an SRI corresponding to the first SRS resource from the multiple SRIs as a target SRI;
    determining, by the terminal device, a power control parameter for the uplink data according to the at least one power control parameter corresponding to the target SRI; and
    determining, by the terminal device, transmit power of the uplink data according to the power control parameter for the uplink data.

2. The method of claim 1, wherein the uplink data comprises part of data in uplink data carried in a Physical Uplink Shared Channel (PUSCH) scheduled by the DCI.

3. The method of claim 2, wherein the uplink data carried in the PUSCH comprises data of N transmission layers, and the uplink data comprises data of M transmission layers in the N transmission layers, N>M>0.

4. The method of claim 3, wherein the target SRI corresponds to the data of the M transmission layers.

5. The method of claim 1, before determining, by the terminal device, the SRI corresponding to the first SRS resource from the multiple SRIs as the target SRI, further comprising:
    receiving, by the terminal device, correspondence information sent by the network device, the correspondence information comprising a correspondence between each of the multiple SRIs and at least one power control parameter.

6. The method of claim 1, wherein determining, by the terminal device, the power control parameter for the uplink data according to the at least one power control parameter corresponding to the target SRI comprises:
    determining, by the terminal device, the at least one power control parameter corresponding to the target SRI as the power control parameter for the uplink data.

7. The method of claim 1, wherein the target SRI is multiple second SRIs of the multiple SRIs, and
    determining, by the terminal device, the power control parameter for the uplink data according to the at least one power control parameter corresponding to the target SRI comprises:

determining, by the terminal device, the power control parameter for the uplink data based on processing of multiple power control parameters corresponding to the multiple second SRIs.

8. A terminal device, comprising:
an acquisition unit, configured to acquire multiple Sounding Reference Signal (SRS) Resource Indications (SRIs) from Downlink Control Information (DCI) scheduling uplink data, each of the multiple SRIs corresponding to at least one power control parameter; and
a processing unit, configured to:
determine a first beam for transmission of the uplink data;
determine a first SRS resource for transmitting an SRS via a same beam as the first beam;
determine an SRI corresponding to the first SRS resource from the multiple SRIs as a target SRI,
determine a power control parameter for the uplink data according to the at least one power control parameter corresponding to the target SRI and
determine transmit power of the uplink data according to the power control parameter for the uplink data.

9. The terminal device of claim 8, wherein the processing unit is configured to:
determine the SRI, corresponding to an SRS resource having a quasi-co-location relationship with the uplink data, of the multiple SRIs as the target SRI.

10. The terminal device of claim 8, wherein the uplink data comprises part of data in uplink data carried in a Physical Uplink Shared Channel (PUSCH) scheduled by the DCI.

11. The terminal device of claim 10, wherein the uplink data carried in the PUSCH comprises data of N transmission layers, and the uplink data comprises data of M transmission layers in the N transmission layers, N>M>O.

12. The terminal device of claim 11, wherein the target SRI corresponds to the data of the M transmission layers.

13. The terminal device of claim 8, wherein the acquisition unit is further configured to:
before the SRI corresponding to the first SRS resource from the multiple SRIs is determined as the target SRI, receive correspondence information sent by the network device, the correspondence information comprising a correspondence between each of the multiple SRIs and at least one power control parameter.

14. The terminal device of claim 8, wherein the processing unit is configured to:
determine the at least one power control parameter corresponding to the target SRI as the power control parameter for the uplink data.

15. The terminal device of claim 8, wherein the target SRI is multiple second SRIs of the multiple SRIs, and
the processing unit is further configured to:
determine the power control parameter for the uplink data based on processing of multiple power control parameters corresponding to the multiple second SRs.

16. The terminal device of claim 8, wherein the at least one power control parameter a path loss value used by the terminal device to determine uplink transmit power, or the at least one power control parameter comprises information of a downlink signal, the information of the downlink signal being used by the terminal device to measure the path loss value for determining the uplink transmit power.

17. The terminal device of claim 8, wherein the at least one power control parameter comprises at least one of an open-loop power control parameter or a closed-loop power control parameter.

18. The terminal device of claim 8, wherein the processing unit is configured to:
receive a bitmap sequence sent by a network device, the bitmap sequence comprising multiple bits and the multiple bits being used to indicate the multiple SRIs.

19. The terminal device of claim 18, wherein each bit in the bitmap sequence indicates a respective SRI of the multiple SRIs;
and the processing unit is further configured to:
determine an SRI corresponding to a first bit indicated to be 1 in the bitmap sequence as the target SRI.

20. The terminal device of claim 8, wherein the processing unit is further configured to determine the transmit power of the uplink data according to:

$$P_{PUSCH,c}(i) = \min\{10\log_{10}(M_{PUSCH,c}(i)) + P_{0,c}(j) + \alpha_c(j) \cdot PL_c(k) + \Delta_{TF,c}(i) + f_c(i,l), P_{CMAX,c}(i)\}.$$

wherein $P_{PUSCH,c}(i)$ represents the transmit power of the uplink data, $P_{0,c}$ represents a target power, $\alpha_c(j)$ represents a path loss factor, $PL_c(k)$ represents an estimated path loss value, and $f_c(i,l)$ represents a closed-loop power regulation function.

* * * * *